United States Patent
Kelly et al.

(10) Patent No.: US 12,210,911 B1
(45) Date of Patent: Jan. 28, 2025

(54) OPERATIONAL VALUE OPTIMIZATION FOR DATA CENTER POWER AND COMPUTATIONAL LOAD

(71) Applicant: CIPHER TECHNOLOGY INC., New York, NY (US)

(72) Inventors: Patrick A. Kelly, New Canaan, CT (US); Bryan Keller, Yarmouth, ME (US); Reuben Govender, Calgary (CA); Samy Biyadi, Angers (FR); Adam Ziskind, Stamford, CT (US)

(73) Assignee: CIPHER TECHNOLOGY INC., New York, NY (US)

( * ) Notice: Subject to any disclaimer, the term of this patent is extended or adjusted under 35 U.S.C. 154(b) by 0 days.

(21) Appl. No.: 18/733,588

(22) Filed: Jun. 4, 2024

Related U.S. Application Data

(63) Continuation of application No. 18/349,748, filed on Jul. 10, 2023.

(51) Int. Cl.
*G06F 9/50* (2006.01)
*G06Q 30/0283* (2023.01)
*G06Q 50/06* (2024.01)

(52) U.S. Cl.
CPC ......... *G06F 9/505* (2013.01); *G06Q 30/0283* (2013.01); *G06Q 50/06* (2013.01)

(58) Field of Classification Search
CPC ..................................................... G06F 9/505
See application file for complete search history.

(56) References Cited

U.S. PATENT DOCUMENTS 8,838,802 B2 9/2014 Van Der Merwe et al.
9,159,042 B2 10/2015 Steven et al.
(Continued)

FOREIGN PATENT DOCUMENTS

AU 2019338540 A1 4/2021
AU 2019338541 A1 4/2021
(Continued)

OTHER PUBLICATIONS

Qureshi, Asfandyar, "Power-Demand Routing in Massive Geo-Distributed Systems," Department of Electrical Engineering and Computer Science, Massachusetts Institute of Technology: Archives Libraries, Sep. 2010, Published Apr. 2011, 171 pages.
(Continued)

*Primary Examiner* — Sisley N Kim
(74) *Attorney, Agent, or Firm* — Sheppard, Mullin, Richter & Hampton LLP

(57) ABSTRACT

Systems and methods may include receiving real-time inputs associated with events impacting at least one of a plurality of operating parameters of a resource site. The systems and methods may analyze changes in at least one of the plurality of operating parameters in real time based on the real-time inputs and based on a feedback loop, and may dynamically determine an optimization for the resource site, which may include analyzing the operating parameters to determine a dynamic value optimization for operating the resource site in real time. The systems and methods may include performing real-time control of power, compute load, or resource-site infrastructure in accordance with a profitability analysis to achieve and maintain a target operational state. Real-time controls may include continuously adjusting resource site controls to alter power usage and achieve and maintain the determined target operational state in real time to reach the determined dynamic value optimization.

30 Claims, 10 Drawing Sheets

(56) References Cited

U.S. PATENT DOCUMENTS

| | | |
|---|---|---|
| 10,079,760 B2 | 9/2018 | Van Der Merwe et al. |
| 10,367,353 B1 | 7/2019 | McNamara et al. |
| 10,444,818 B1 | 10/2019 | McNamara et al. |
| 10,452,127 B1 | 10/2019 | McNamara et al. |
| 10,608,433 B1 | 3/2020 | McNamara et al. |
| 10,618,427 B1 | 4/2020 | McNamara et al. |
| 10,857,899 B1 | 12/2020 | McNamara et al. |
| 10,873,211 B2 | 12/2020 | McNamara et al. |
| 11,016,456 B2 | 5/2021 | Henson et al. |
| 11,016,458 B2 | 5/2021 | McNamara et al. |
| 11,016,553 B2 | 5/2021 | McNamara et al. |
| 11,025,060 B2 | 6/2021 | McNamara et al. |
| 11,031,783 B2 | 6/2021 | McNamara et al. |
| 11,031,787 B2 | 6/2021 | McNamara et al. |
| 11,031,813 B2 | 6/2021 | McNamara et al. |
| 11,042,948 B1 | 6/2021 | McNamara et al. |
| 11,128,165 B2 | 9/2021 | McNamara et al. |
| 11,163,280 B2 | 11/2021 | Henson et al. |
| 11,256,320 B2 | 2/2022 | McNamara et al. |
| 11,275,427 B2 | 3/2022 | McNamara et al. |
| 11,283,261 B2 | 3/2022 | McNamara et al. |
| 11,342,746 B2 | 5/2022 | McNamara et al. |
| 11,397,999 B2 | 7/2022 | McNamara et al. |
| 11,431,195 B2 | 8/2022 | McNamara et al. |
| 11,581,734 B2 | 2/2023 | McNamara et al. |
| 11,611,219 B2 | 3/2023 | McNamara et al. |
| 11,650,639 B2 | 5/2023 | McNamara et al. |
| 11,669,144 B2 | 6/2023 | McNamara et al. |
| 11,669,920 B2 | 6/2023 | McNamara et al. |
| 11,678,615 B2 | 6/2023 | Henson et al. |
| 11,682,902 B2 | 6/2023 | McNamara et al. |
| 11,868,106 B2 | 1/2024 | McNamara et al. |
| 11,949,232 B2 | 4/2024 | McNamara et al. |
| 11,961,151 B2 | 4/2024 | McNamara et al. |
| 12,021,385 B2 | 6/2024 | McNamara et al. |
| 2009/0113057 A1 | 4/2009 | Van Der Merwe et al. |
| 2011/0251730 A1 | 10/2011 | Pitt |
| 2014/0379863 A1 | 12/2014 | Van Der Merwe et al. |
| 2017/0336857 A1 | 11/2017 | Sun et al. |
| 2019/0014046 A1 | 1/2019 | Van Der Merwe et al. |
| 2019/0354076 A1 | 11/2019 | Henson et al. |
| 2020/0089307 A1 | 3/2020 | McNamara et al. |
| 2020/0091717 A1 | 3/2020 | McNamara et al. |
| 2020/0091727 A1 | 3/2020 | McNamara et al. |
| 2020/0091766 A1 | 3/2020 | McNamara et al. |
| 2020/0136387 A1 | 4/2020 | McNamara et al. |
| 2020/0136388 A1 | 4/2020 | McNamara et al. |
| 2020/0136432 A1 | 4/2020 | McNamara et al. |
| 2020/0225726 A1 | 7/2020 | McNamara et al. |
| 2020/0274388 A1 | 8/2020 | McNamara et al. |
| 2020/0359572 A1 | 11/2020 | Henson et al. |
| 2020/0379537 A1 | 12/2020 | Henson et al. |
| 2020/0409814 A1 | 12/2020 | Tiwari |
| 2021/0035242 A1* | 2/2021 | McNamara ......... G06F 11/3495 |
| 2021/0036547 A1 | 2/2021 | McNamara et al. |
| 2021/0101499 A1 | 4/2021 | McNamara et al. |
| 2021/0111585 A1 | 4/2021 | McNamara et al. |
| 2021/0124322 A1 | 4/2021 | McNamara et al. |
| 2021/0126456 A1 | 4/2021 | McNamara et al. |
| 2021/0287309 A1 | 9/2021 | Gebhardt et al. |
| 2021/0288495 A1 | 9/2021 | McNamara et al. |
| 2021/0288496 A1 | 9/2021 | McNamara et al. |
| 2021/0294405 A1 | 9/2021 | McNamara et al. |
| 2021/0296893 A1 | 9/2021 | McNamara et al. |
| 2021/0296928 A1 | 9/2021 | McNamara et al. |
| 2021/0312574 A1 | 10/2021 | McNamara et al. |
| 2021/0325955 A1 | 10/2021 | McNamara et al. |
| 2022/0050433 A1 | 2/2022 | Henson et al. |
| 2022/0085603 A1 | 3/2022 | McNamara et al. |
| 2022/0171449 A1 | 6/2022 | McNamara et al. |
| 2022/0197363 A1 | 6/2022 | McNamara et al. |
| 2022/0294219 A1 | 9/2022 | McNamara et al. |
| 2022/0366517 A1 | 11/2022 | McNamara et al. |
| 2022/0407350 A1 | 12/2022 | McNamara et al. |
| 2022/0417170 A1 | 12/2022 | Shrestha et al. |
| 2023/0121669 A1 | 4/2023 | McNamara et al. |
| 2023/0178995 A1 | 6/2023 | McNamara et al. |
| 2023/0185346 A1 | 6/2023 | McNamara et al. |
| 2023/0187937 A1 | 6/2023 | McNamara et al. |
| 2023/0208138 A1 | 6/2023 | McNamara et al. |
| 2023/0228446 A1 | 7/2023 | Lee et al. |
| 2023/0259192 A1 | 8/2023 | McNamara et al. |
| 2023/0275432 A1 | 8/2023 | McNamara et al. |
| 2023/0281732 A1 | 9/2023 | McNamara et al. |
| 2023/0284570 A1 | 9/2023 | Henson et al. |
| 2023/0394602 A1* | 12/2023 | Kim .......................... H02J 3/38 |
| 2023/0420940 A1 | 12/2023 | McNamara et al. |
| 2024/0134333 A1 | 4/2024 | McNamara et al. |
| 2024/0144399 A1 | 5/2024 | McNamara et al. |

FOREIGN PATENT DOCUMENTS

| | | |
|---|---|---|
| AU | 2019339494 A1 | 4/2021 |
| AU | 2019339498 A1 | 4/2021 |
| AU | 2020372976 A1 | 5/2022 |
| AU | 2021228704 A1 | 10/2022 |
| BR | 112021004349 A2 | 5/2021 |
| BR | 112021004358 A2 | 5/2021 |
| BR | 112022008086 A2 | 9/2022 |
| CA | 3088184 A1 | 7/2019 |
| CA | 3111583 A1 | 3/2020 |
| CA | 3111830 A1 | 3/2020 |
| CA | 3112033 A1 | 3/2020 |
| CA | 3112037 A1 | 3/2020 |
| CA | 3118128 A1 | 5/2020 |
| CA | 3118219 A1 | 5/2020 |
| CA | 3126390 A1 | 7/2020 |
| CA | 3128478 A1 | 9/2020 |
| CA | 3145483 A1 | 2/2021 |
| CA | 3145486 A1 | 2/2021 |
| CA | 3156426 A1 | 5/2021 |
| CA | 3167946 A1 | 9/2021 |
| CA | 3128478 C | 5/2022 |
| CN | 103530801 A | 1/2014 |
| CN | 103854062 A | 6/2014 |
| CN | 104158754 B | 7/2017 |
| CN | 107482766 A | 12/2017 |
| CN | 110308991 B | 6/2020 |
| CN | 112106051 A | 12/2020 |
| CN | 113056716 A | 6/2021 |
| CN | 113196201 A | 7/2021 |
| CN | 113196201 B | 7/2021 |
| CN | 115330015 A | 11/2022 |
| CN | 115800390 A | 3/2023 |
| EP | 3738014 A1 | 11/2020 |
| EP | 3850461 A1 | 7/2021 |
| EP | 3850462 A1 | 7/2021 |
| EP | 3850462 A4 | 7/2021 |
| EP | 3850463 A1 | 7/2021 |
| EP | 3850465 A1 | 7/2021 |
| EP | 3874349 A2 | 9/2021 |
| EP | 3874578 A1 | 9/2021 |
| EP | 3894989 A1 | 10/2021 |
| EP | 3738014 A4 | 1/2022 |
| EP | 3850463 A4 | 5/2022 |
| EP | 3850465 A4 | 6/2022 |
| EP | 4007987 A1 | 6/2022 |
| EP | 4008046 A1 | 6/2022 |
| EP | 3874349 A4 | 7/2022 |
| EP | 3874578 A4 | 8/2022 |
| EP | 3894989 A4 | 9/2022 |
| EP | 4052109 A1 | 9/2022 |
| EP | 4111568 A1 | 1/2023 |
| EP | 4007987 A4 | 8/2023 |
| EP | 4008046 A4 | 8/2023 |
| EP | 4052109 A4 | 12/2023 |
| EP | 4060457 A1 | 12/2023 |
| EP | 3850465 B1 | 5/2024 |
| GB | 2597342 A | 1/2022 |
| WO | WO2019139632 A1 | 7/2019 |
| WO | WO2019139633 A1 | 7/2019 |
| WO | WO2020056296 A1 | 3/2020 |
| WO | WO2020056308 A1 | 3/2020 |
| WO | WO2020056319 A1 | 3/2020 |

(56) References Cited

FOREIGN PATENT DOCUMENTS

| WO | WO2020056322 A1 | 3/2020 |
| WO | WO2020092627 A2 | 5/2020 |
| WO | WO2020092627 A3 | 5/2020 |
| WO | WO2020092628 A1 | 5/2020 |
| WO | WO2020146875 A1 | 7/2020 |
| WO | WO2020176486 A1 | 9/2020 |
| WO | WO2021022174 A1 | 2/2021 |
| WO | WO2021022175 A1 | 2/2021 |
| WO | WO2021086930 A1 | 5/2021 |
| WO | WO2021173973 A1 | 9/2021 |

OTHER PUBLICATIONS

International Search Report and Written Opinion dated Oct. 30, 2024 for International Application No. PCT/US2024/037218, filed on Jul. 9, 2024.

* cited by examiner

OPERATIONAL VALUE OPTIMIZATION FOR DATA CENTER POWER AND COMPUTATIONAL LOAD

CROSS-REFERENCE TO RELATED APPLICATION

The present application is a continuation of and claims priority to U.S. patent application Ser. No. 18/349,748, filed Jul. 10, 2023 and titled "OPERATIONAL VALUE OPTIMIZATION FOR DATA CENTER POWER AND COMPUTATIONAL LOAD," which is incorporated herein by reference in its entirety.

DESCRIPTION OF RELATED ART

The present application generally relates to real-time management of data center compute load to maximize value of power economics and supply. In particular this application describes the ability to adjust the compute capacity, and therefore power usage, to facilitate balancing of power supply and demand, and the ability to economically maximize utilization of intermittent power source like wind or solar.

BRIEF DESCRIPTION OF THE DRAWINGS

The present disclosure, in accordance with one or more various embodiments, is described in detail with reference to the following figures. The figures are provided for purpose of illustration only and merely depict typical or example embodiments.

Figure 1:
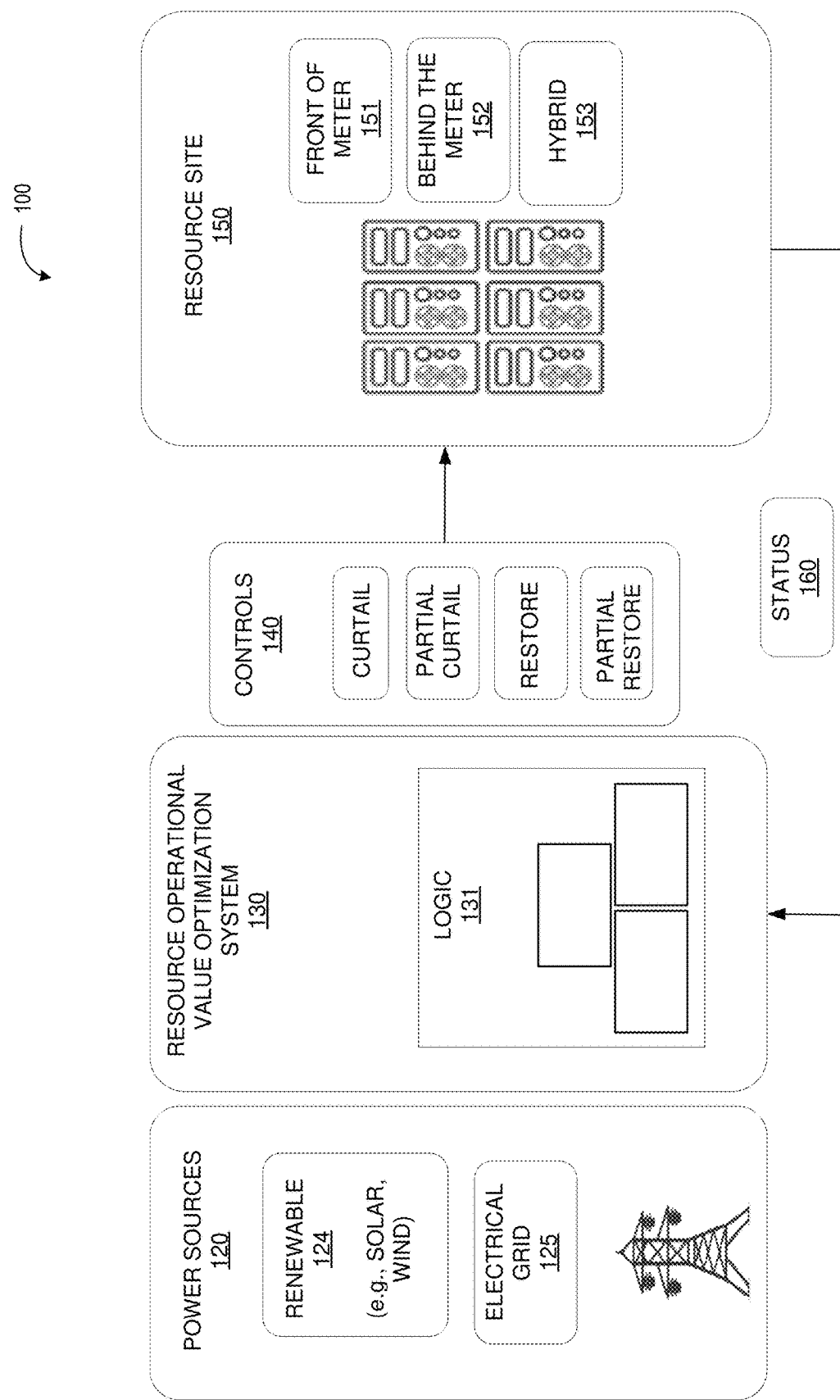
FIG. 1 depicts an example of an operational environment including a system implementing operational value optimization for a data center, in accordance with embodiments of the application.

These illustrative embodiments are mentioned not to limit or define the disclosure, but to provide examples to aid understanding thereof. Additional embodiments are discussed in the Detailed Description, and further description is provided there.

DETAILED DESCRIPTION

Power optimization generally involves techniques and strategies employed to manage power consumption of electronic devices and/or systems. Power optimization is crucial in various domains, including mobile devices, embedded systems, data centers, and energy-constrained environments. Overall, power optimization techniques focus on balancing performance requirements with power consumption to reduce energy costs, improve overall power efficiency, and promote sustainability in electronic systems. A particular technique that is used for power optimization in the realm of computing is dynamic power management. Dynamic power management can include dynamically adjusting the power consumption of different systems and/or resources within the data center based on the workload, demand, and other environmental conditions. Dynamic power management in data centers aims to strike a balance between performance, resource utilization, and power consumption. There are several different approaches used in industry to perform dynamic power management, including: workload consolidation; dynamic resource provisioning; power capping; energy-aware scheduling; dynamic cooling; and energy monitoring and management.

However, many dynamic power management systems that are currently utilized in industry do not have the capability to perform continuous and real-time control of the data center and thus cannot achieve optimal performance. For instance, there are existing systems that are capable of migrating compute loads to alternate geographies and/or completely curtailing data center usage. However, these existing systems are not able to partially adjust compute load, and related power usage, on a real-time basis and control resources based on state awareness in conjunction with operational feedback from the datacenter. This creates a delay in the control cycle, which can require a substantial period of time to execute follow-on commands necessary to achieve a particular consumption target. This significantly limits the ability of the existing art to respond in real time to intermittent generation, or economically optimize usage to correspond with power supply and demand imbalances. In particular when utilizing intermittent generation such as wind or solar, existing power management systems will issue commands to manage operations and must wait to observe the residual impact that the particular commands have on the site prior to generating the next commands. This time lull substantively limits the efficiency and adaptability in adjusting the operation at the data center, causing power management to not respond effectively to variability in power generation. Due to lack of awareness of the real-time operating usage combined with estimated impact of commands that have been issued but not yet reflected in usage. There is significant risk that the subsequent commands will result in over-control of the data center. This could cause either under-performance of the data-center or attempted over-utilization of available power, resulting in physical damage to resources.

Furthermore, many existing dynamic power management systems are designed for vertical scalability. That is, scalability of the systems is limited to the resources on the server hosting the application. For example, if the number of compute resources to be controlled increases, greater computational demand of the control application would require the management server to be upgraded to accommodate the larger capacity. Thus, as data center sites scale-up, a conventional management system may require more or faster processors, increasing storage capacity, and the like, which limits the ability to expand to the resources of an individual server. Due to this vertically scalable design, existing dynamic power management systems can have significant limitations in terms of costs, resource availability, and their ability to handle extremely large-scale applications.

As disclosed herein, distinct methods and systems may be provided for real-time, scalable, systematic, event-based, model-driven operational value optimization. As will be described in greater detail throughout, the disclosed methods and systems receive a plethora of real-time information that impacts the optimization of operations at the data center. These include, though are not limited to, power-market data (e.g., real-time and day-ahead power prices, power generation, consumption, ancillary services markets, etc.), weather-based data that may impact performance of the data center's resources and/or the power sources/supply, market-based data relating to revenue that may be derived from the data center's operation, real-time operational feedback from the data center, and stochastic modeling to understand correlations and future predictions of data sources. Various embodiments may apply some or all of this plurality of real-time data to powerful decision-making logic which analyzes various factors gleaned from the real-time information in order to determine a dynamic value optimization for operating the data center. Embodiments may also contain the ability to adaptively command operation of the data center (e.g., full curtailment of power and/or compute load, partial curtailment of power and/or compute load, etc.) in a manner that dynamically and in real time optimizes operations. Furthermore, embodiments may provide a solution that has modularly designed logic and a horizontally designed framework to efficiently support a plethora of applications, even at large-scale.

FIG. 1 depicts an example environment 100 in which a ROVO system 130 and its functions are implemented. The ROVO system 130, according to various embodiments, encapsulates the value optimizing logic described herein. As seen in FIG. 1, the example environment 100 illustrates that the ROVO system 130 is capable of applying varied logic based on a plurality of power sources 120, and a resource site 150 which is depicted as a data center site of various computer resources (e.g., servers) that are capable of handling compute loads associated with various applications such as Bitcoin mining or machine learning (ML). Although Bitcoin mining is described in reference to FIG. 1 as an example application for purposes of illustration, as will be discussed throughout, the systems and methods disclosed herein are not intended to be limited to cryptocurrency (e.g., Bitcoin) and thus can be employed with other applications associated with processing interruptible compute loads without departing from the scope of the embodiments.

In the example of FIG. 1, the types of power sources 120 depicted include examples of energy producers, which are shown as renewable energy producers 124 and electrical grid 125. The renewable energy producers 124 (also referred to herein as intermittent power sources) can be considered power sources that generate various forms of renewable energy. As referred to herein, renewable energy is energy that can be obtained from naturally replenishing sources which is consumed in a manner that is less determinantal to the environment (e.g., minimal or no greenhouse gas emissions), unlike fossil fuels which are finite and contribute to environmental pollution and climate change. Renewable energy producers 124 can include sites such as solar power stations, wind farms, and the like, which are built to harness renewable energy from natural sources such as the sun, wind, water, geothermal heat, hydrogen, and biomass that can be converted into a usable form like electricity. Thus, examples of power sources can include other forms of producible energy, such as battery storage, hydrogen production, and the like. Although not shown in FIG. 1, it should be appreciated that power sources 120 can include other forms of energy producers, such as providers of traditional or thermal energy sources including gas, coal, oil (e.g., petroleum) and the like. Power sources 120 can also include creators of any future energy sources that may be developed in emerging technology. Thus, the power sources 120 shown in FIG. 1 are not intended to be exhaustive and the systems and methods disclosed herein are applicable to renewable, non-renewable, and future energy producers without departing from the scope of the embodiments.

The electrical grid 125 is a complex network of interconnected power generation plants, transmission lines, distribution systems, and consumers. The electrical grid 125 is responsible for delivering electricity from producers, such as power plants, to the consumers that can include homes, businesses, and other end-users. As alluded to above, the front-of-meter (FOM) site 121, behind-the-meter (B™) site 122, and hybrid site 123 can be connected to the renewable energy producers 124 and/or the electrical grid 125 and/or non-renewable energy producers (not shown in FIG. 1) as sources of power.

In the example of FIG. 1, the resource site 150 is illustrated as a data center which is powered by the energy generated by at least one of the power sources 120. Thus, in the example of FIG. 1, the resource site 150 is a centralized facility that houses computer systems and associated components, such as servers, storage systems, networking equipment, and infrastructure required for managing, processing, storing, and distributing large amounts of data. A compute load refers to the computational processing tasks a data center (or other computer resource) is expected to handle or execute. Efficiently managing compute loads is crucial for optimizing resource utilization, ensuring performance, and meeting service-level objectives. As a data center, the resource site 150 can support sophisticated scheduling, resource allocation, and load balancing techniques to distribute compute loads across available resources and maintain optimal operation. Although not shown in the example of FIG. 1, the B™ site 122 and the hybrid site 123 can be co-located at the resource site 150, for instance including connectivity to energy producers supplying electricity to the data center.

In FIG. 1, the compute load is associated with applications such as Bitcoin mining, machine learning (ML), or artificial intelligence (AI) model training that can experience periodic downtime or reduced performance without impacting the ultimate product of compute. In the case of curtailment, the compute load may take longer to process though the resultant output will still be valid. The resource site 150 can experience several periods of downtime or reduced capacity without degrading the resultant product of the application, whereas many conventional data centers are expected to be up and fully operation virtually all the time. Moreover, the compute load and general operation of the resource site 150 has aspects of financial profitability, where revenue can be obtained from executing compute loads to mine for Bitcoin or otherwise monetize compute capacity. The ROVO system 130 can leverage these characteristics associated with power and compute load of the resource site 150 in order to perform an optimization of the site's 150 operation in a manner that maximizes profitability, which is generally referred to herein as operational value optimization.

In the example of FIG. 1, the resource site 150 includes a FOM site 151, a B™ site 152, and a hybrid site 153.

The FOM site 151 can be a resource site where energy is sourced directly from the power grid. The FOM site 151 is subject to metered consumption tariff which can include fluctuating real-time pricing, transmission charges, and other related fees. FOM sites, such as FOM site 151, can also participate in other hedging or revenue generating schemes offered by the grid provider, such pre-purchasing power on a day-ahead basis or selling the curtailment optionality.

The B™ site 152 can be a co-located resource site where power is sourced directly from the generation asset and/or energy storage mechanism. The generation asset may be an intermittent or renewable source such as wind or solar or a traditional thermal source. In other words, the B™ site 152 can operate independent of the utility grid and is directly connected to the producers' generation facility and electrical infrastructure.

The hybrid site 153 is a combination of a FOM site 151 and a B™ site 152, whereas a site with B™ also has a grid connection to offer source optionality and increased availability of power.

In the example of FIG. 1, the ROVO system 130 can be implemented as a computer system, being depicted as a server that is communicatively connected to the resource site 150, the power sources 120 and any other entities within the vicinity of the operating environment 100. Furthermore, the ROVO system 130 might include one or more processors, controllers, control modules, or other processing devices, and implements aspects of the logic 131 as hardware processor(s). Furthermore, some aspects of the logic 131 may be implemented as software on the computer system implementing the ROVO system 130, such as instructions, machine-readable code, or computer programming components.

The ROVO system 130, in accordance with various embodiments, combines control, data, and insight to maximize the operational value optimization of the resource site 150 by dynamically adjusting the power and compute load in real time. For example, if the ROVO system 130 determines that it is not profitable for the resource site 150 to currently operate, as a current spike in power costs outweighs the revenue from the compute, then the ROVO system 130 has the capability to issue a real-time control 140 to the resource site 150 which curtail the power and/or compute load at the site 150 until a later time when the power costs are lower. As a general description, the ROVO system 130 can receive real-time data streamed from the power sources 120 that may contribute to operational value optimization, such as wind turbine data, weather data, production data, energy market data, and the like. The ROVO system 130 may be configured with logic 131 that can continuously monitor, model, and analyze this streamed data in real time to determine a compute and/or power utilization target, and send controls 140 in real time to coordinate the resources at the resource site 150 in a manner to reach the target and achieve operational value optimization. It should be appreciated that although the embodiments and the example of FIG. 1 are described in reference to certain data center applications, the implementation is not intended to be limiting. The ROVO system 130 and its functions are applicable to other forms of high-performance resources and compute, such as cryptography, artificial intelligence (AI) and/or machine learning (ML) model training, power storage systems, and the like.

FIG. 1 illustrates that the controls 140 can include actions that dynamically govern the function of power and/or compute load at the resource site 150 for optimization. For example, controls 140 can include curtail, partial curtail (in variable magnitudes between fully operational and fully curtailed), restore, and partial restore (in variable magnitudes between curtailed and fully restored). The ROVO system 130 has the capability to continuously communicate controls 140 to the resource site 150 in real time, where the continual issuing of real-time controls allows successive controls that are transmitted to the resource site 150 to be performed. Accordingly, the ROVO system 130 is distinctly designed to adjust operation of the resource site 150 in real time and mitigate a delay in the control cycle, which otherwise require a substantial period of time to execute the successive commands necessary to achieving a particular operational value optimization target.

FIG. 1 also serves to illustrate a key concept of the ROVO system 130, which involves a continuous feedback loop of real-time status information 160 indicating the current operational state of the resource site 150 which can be used at the ROVO system 130 for subsequent modeling, analysis, and recalibration (if needed). By analyzing the controls 140, and the continuous status information 160 from the resource site 150, the ROVO system 130 has an awareness regarding how its logic 131 and controls 140 are physically impacting the performance and optimization of the resource site 150. In some embodiments, the feedback from the resource site 150 is utilized by the ROVO system 150 to perform real-time monitoring and/or alerting of the site 150, generate performance metrics, and re-train the stochastic models in the logic 131. Thus, the ROVO system 130 is continuously recalibrating and self-learning in order to determine the most optimal operation (and controls 140) to achieve operational value optimization at the resource site 150. Greater detail regarding the functionality of the decision-making logic 131 is described in reference to FIG. 4-FIG. 6C. For purposes of brevity these details are not also described exhaustively here in reference to FIG. 1.

FIG. 1 also illustrates that the logic 131 of the ROVO system 130 can be implemented as modular logic blocks that can be adaptively compiled in a manner that is most optimal for a particular scenario. That is, the logic 131 ROVO system 130 can have multiple logic blocks, where each block corresponds to a defined series of decision steps that have been deemed optimal for a specific scenario. As an example, the B™ site 122 may have a unique set of challenges due to its configuration and characteristics, and accordingly the ROVO system 130 can have defined logic blocks that are suitable for making decisions regarding optimization that is deemed optimal for the B™ site 122 scenario. Continuing with this example, the B™ site 122 may have no grid connection, needing to react to 100% of power production volatility in real time while maximizing usage of available power. However, wind power can be challenging because of high variability; for instance, storms can come suddenly and wind can stop and/or start blowing within seconds. There may be significant consequences at the B™ site 122 associated with consuming more than the wind farm produces, such as undervoltage conditions that can damage infrastructure and equipment. However, the ROVO system 130 has modular logic 131 with decisions tailored to best address the site's specific concerns in order to reach optimization. Furthermore, the blocks of logic 131 can be combined to generate a scenario and/or application-specific logic after the system's 130 deployment, affording the ability to evolve the ROVO's system's 130 decision making to be even more appropriate for the customer's use and enhancing the system's overall optimization capabilities.

Figure 2:
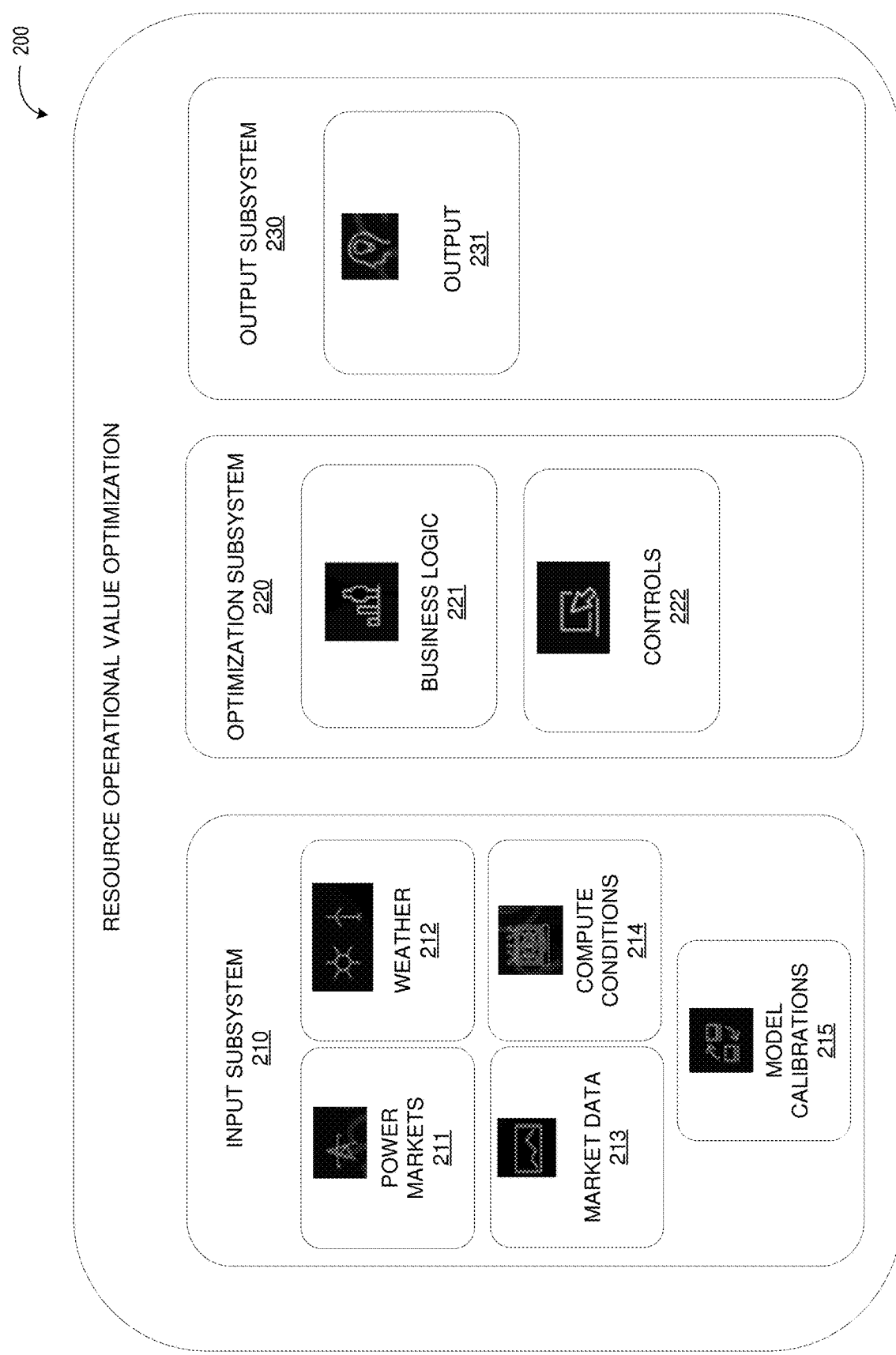
FIG. 2 depicts an example architectural configuration of the system implementing operational value optimization shown in FIG. 1, in accordance with some embodiments of the application.

FIG. 2 depicts an example of an internal architecture of the ROVO system 200, also shown in the example of FIG. 1. As illustrated in FIG. 2, the framework of the system 200 can include, but is not limited to: an input subsystem 210 which receives real-time input 211-215 that may be pertinent to the operation of the data center that is streamed from a plurality of sources; an optimization subsystem 220 which implements a business logic 221 that considers several contributing factors such as power costs and compute load revenue, to dynamically determine a value optimization corresponding to the target operational state of the data center, which continuously adjusts controls of the data center based on the dynamic value optimization; and an output subsystem 230 which communicates the controls generated by the optimization subsystem 220 as output 231 to the appropriate data center (e.g., servers, internal infrastructure, etc.) to optimize its operations in real time.

The input subsystem 210 may be configured to receive multiple streams of real-time data from a plurality of sources that are associated with the function of the data center, for instance different power sources that can supply electricity and/or renewable energy (e.g., wind, solar, etc.) to the data center. In the example of FIG. 2, the input subsystem 210 is shown to have a plurality of inputs that include: power market inputs 211; weather inputs 212; market inputs 213; compute conditions inputs 214; and model calibration inputs 215. Power market inputs 211 can include real-time data that indicates, or otherwise pertains to, the current market price of power (i.e., spot power prices), forward/day ahead power prices, plant operations, wind power production, solar power production, grid congestion, curtailment options, peak grid usage, and the like. Weather inputs 212 can include real-time data that indicates, or otherwise pertains to, wind/solar predictive models, ambient conditions, humidity, dew point, wind direction, and the like. Market inputs 213 can include real-time data that indicates, or otherwise pertains to, the current market price of compute (i.e., spot revenue), compute derivatives, and the like. Compute conditions inputs 214 can include real-time data that indicates, or otherwise pertains to, predicted power usage, actual power usage, compute efficiency, and the like. Model calibration inputs 215 can include real-time data that indicates, or otherwise pertains to, a feedback loop from operations (e.g., compute resource metrics) at the data center, applications of machine learning (ML) and/or artificial intelligence (AI) techniques. It should be appreciated that the example inputs 211-215 which are communicatively received by the input subsystem 210 is not intended to be exhaustive, and other types of real-time information may additionally serve as inputs into the system 200 as deemed necessary and/or appropriate.

The optimization subsystem 220 may be configured to implement the business logic 221 which determines a value optimization for operation of the data center and generate controls 222 which govern the operation of the data center in real time in accordance with the determined value optimization. According to various embodiments, the business logic 221 may be configured to determine value optimization through real-time modeling, and portfolio (e.g., asset) optimization. The business logic 221 implements a modular and sophisticated decision tree given the real-time inputs 211-215 that have been fed into the system 200, where the inputs 211-215 can be analyzed in a manner that enables the system 200 to have awareness of the current operational condition of the data center and various factors that may directly impact the efficiency and/or optimization of the data center's operation, such as power supply availability, power costs (e.g., actual, predicted), and potential revenue from the compute load and/or sale of power or power-related products. Greater detail regarding the functionality of decision-making aspects of the business logic 221 is described in reference to FIG. 4-FIG. 6C. For purposes of brevity these details are not also described exhaustively here in reference to FIG. 2.

As an example, the business logic 221 can analyze power markets and a cost associated with executing its compute load to determine an optimized operation, for instance temporarily curtailing the compute load while the grid is at peak usage (e.g., associated with substantively high electricity costs) until the grid usage is reduced within a range with lower costs (e.g., predetermined power cost threshold). In another example, the business logic 221 may be configured to receive signals/messages that may drive a discrete decision, such as an emergency message from an electrical power provider or grid operator that electricity must be turned off in order to protect the grid, which would then drive a decision to fully curtail the compute load and/or power down the data center.

Additionally, the business logic 221 may be configured to generate and utilize stochastic modeling of real-time data (e.g., inputs 211-215) in order to derive the current operational efficiency of the data center and further extrapolate a predicted optimal operation for the data center in a dynamic manner, for instance updating the value optimization of the data center per-second. For example, the business logic 221 can train and apply a stochastic model to provide predictions for future available wind generation capacity, based on modeling and analyzing real-time data that impacts operation of the wind farm, such as weather data, wind speed, and production data from the wind farm. Thus, the business logic 221 can leverage the stochastic model which has been trained on these types of data over time, in order to predict availability related to the power source, and predictively manage the compute load in-line with the availability of power sourced from the wind farm. Moreover, a key feature of embodiments of the system 200 is its ability to receive feedback from the data centers in real time, which enables a re-training of models based on the most current operational state of the data center. As a result, the business logic 221 can fine-tune its models by continuously capturing and analyzing information that is fed back from the data center which monitors the impact that the dynamic adjustments issued from the system 200 have on the data center actually realizing optimization (e.g., previous commands causing the data center to diverge from value optimization) and re-calibrate the models if necessary.

Additionally, the business logic 221 can further leverage stochastic models to derive and analyze various probabilities that may impact a value optimization of the data center's operation. As an example, the business logic 221 can determine a probability of a short-term drastic increase (e.g., spike) in power price within a determined time period, which allows the probability of a potential power price spike to be a factor that is considered in setting thresholds for value optimization. Its operation, for instance curtailing the compute load in the case of a high probability of a spike, can be within the logic's 221 decision tree. The business model 221 can also use stochastic modeling in order to consider a predicted impact that modifying the data center's operation may have on value optimization. For instance, there is a cost associated with curtailing the compute load at the data center, such as potential lost revenue from not executing the compute, lost efficiency/production associated with the data center, cost associated with restoring the data center and/or compute load after curtailment, and the like. The business logic 221 may be configured with stochastic models that can statistically make these types of determinations related to modifying the data center's operation, such as an amount of time needed to recuperate the costs in the event of data center and/or compute load curtailment. In this example, the business logic 221 may determine that, even if power costs are higher, that it is statically not optimal to curtail a compute load due to a significantly high cost of curtailment and a lengthy process to recover from those losses from curtailing the compute load.

In addition, the business logic 221 may be configured to perform portfolio optimization. The system 200 may manage a plurality of different elements that are considered assets (e.g., having financial and/or physical value), such as multiple data centers (and its resources), power markets, ancillary services markets, financial assets, and the like. The business logic 221 has the capability to track, analyze, correlate, and dynamically manage the portfolio of assets, for instance several data center sites, in order to achieve value optimization.

The optimization subsystem 220 also implements the dynamic generation of controls 222 which can effectuate an adjustment of the data center's operation substantively in real time. Based on value optimization determinations and decisions regarding particular modification/adjustments to the operation of the data center that are made by the business logic 221, the optimization subsystem 220 generates corresponding controls 222 which command the functions of the data center to execute the decisions (e.g., curtailment, restore) in a manner that achieves the determined value optimization. The controls 222 can command the function of various elements of the data center in real time, such as the compute, power, system/infrastructure components, and environmental elements in order to ultimately optimize the data center efficiency. For example, controls 222 can include functions such as curtailment of the compute load and/or power, partial curtailment of the compute load and/or power (e.g., variable curtailment in a range between full operation and full curtailment), restore compute load and/or power, and partial restore (e.g., variable restore in a range between curtailment and fully restored). In an embodiment, the optimization subsystem 220 can generate new controls 222, which allows for a continuous fine-tuning of the data center's operation, which thereby enables granular optimization of the data center. In some cases, the controls 222 can include commands to the data center's infrastructure components, for instance increasing the speed of exhaust fans (e.g., cooling the servers), in a manner that improves the performance of the data center's resources to achieve optimization. Furthermore, according to various embodiments, controls 222 can be generated for each resource (e.g., server) that is located within a particular data center. That is, the system 200 may include the capability to simultaneously interact with and control a plurality of data centers and their respective resources across multiple sites (e.g., remote and/or co-located) at an extremely large scale (e.g., upwards of 100,000 servers).

The output subsystem 230 may be configured to generate and disseminate various outputs 231 from the system 200 to connected entities, such as the data centers. Examples of outputs 231 that can be communicated by the output subsystem 230 include but are not limited to: compute/hardware commands; horizontal scalability; distributed management; continuous control (e.g., state management); power optimization strategies; asset optimization strategies; model feedback loop (e.g., calibration); real-time metrics and monitoring; and the like. In an embodiment, the controls 222 are communicated as output 231 using command control signal(s) transmitted to data centers across a distributed communication network (e.g., wide-area network). The outputs 231 are generated by the ROVO system 200 in a manner that ultimately achieves and continuously maintains an optimal run state of the data center (in accordance with the value optimization and operational decisions from the business logic 221).

Figure 3:
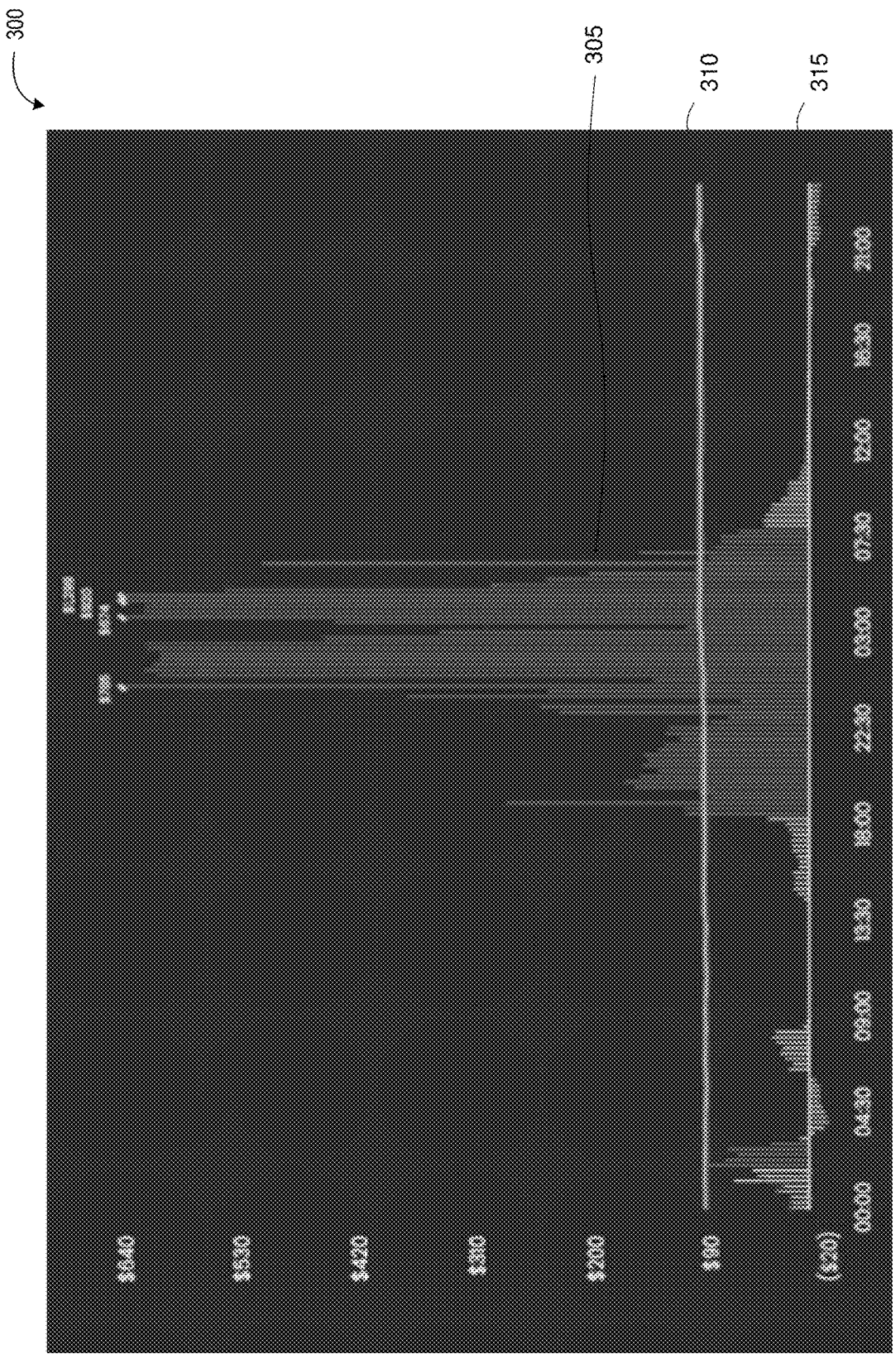
FIG. 3 depicts a graphical representation of operational value optimization for data center controls, in accordance with some embodiments of the application.

FIG. 3 depicts a graphical representation 300 of a potential operation of the ROVO systems and methods, as disclosed herein. For example, the graphical representation 300 illustrated in FIG. 3 may be a form of graphical user interface (GUI) that is generated by the ROVO system (shown in FIG. 1) and displayed to an end-user in order to support interactive features of the system. The line 310 represents Bitcoin mining revenue, line 305 represents open market power prices, and line 315 represents self-curtailed power prices. In accordance with various embodiments, the self-curtailment price, indicated by line 315, may be dynamically generated by the disclosed systems based on its value optimization decision-making logic, particularly for a B™ site scenario to curtail the compute load in a manner that optimizes profitability for a Bitcoin mining application. It should be appreciated that the example of FIG. 3, which is specific to a Bitcoin application, is not intended to be limiting, and the ROVO systems and methods, as disclosed herein, can be used with a plethora of applications that are able tolerate an intermittent compute.

Figure 4:
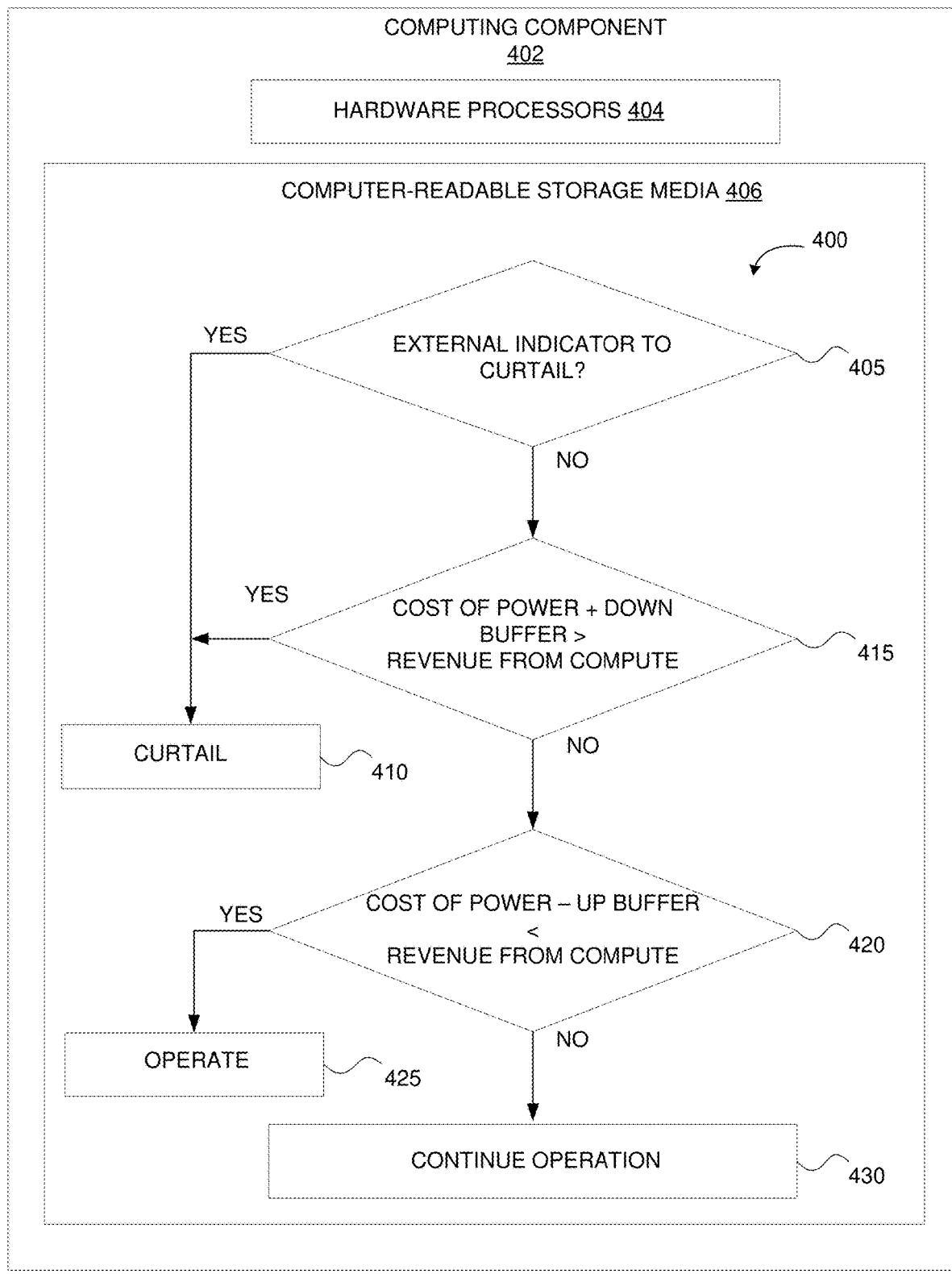
FIG. 4 depicts an example flow diagram for a method implementing a decision-making logic for operational value optimization, where the operation is implemented by the resource operational value optimization (ROVO) system of FIG. 1, in accordance with some embodiments of the application.

FIG. 4 diagrams an example of a process 400 that is performed according to one embodiment of the systems and methods described herein. As seen in FIG. 4, process 400 is illustrated as a series of executable operations in a machine-readable storage media 406 performed by a hardware processor 404. The computing component 402 can be a computer device used for implementing the disclosed operational value optimization functions described herein. For example, the computing component 402 may be the computer device or cloud compute resource implementing the ROVO system described above in reference to FIG. 1.

Generally, process 400 implements a decision-making logic that may be optimal for a FOM site, according to some embodiments. In a FOM site scenario, there may be several goals that govern the logic in process 400, including, for example: the site should only operate when profitable; revenue should be enhanced through participation in day-ahead markets; ancillary services should be monetized through rapid curtailment at the request of the grid operator; and to avoid coincidental demand charges. That is, the process 400 implements a logic that principally endeavors to curtail in order to capture excess revenue by selling the power back to the market from existing forward purchases or otherwise monetizing grid balancing programs such as ancillary services, as opposed to curtailing to avoid costs. Particularly, process 400 may be configured to optimize dollar profitability for grid connected sites.

Process 400 can begin at operation 405, where it is determined whether an external indicator is received to curtail. In some cases, the option to curtail is sold to an external party as a means of revenue. Therefore, curtailment of the data center's power and/or compute is under external control. If operation 405 determines that an external indicator to curtail was received (shown as "Yes" in FIG. 4), then the process 400 continues to operation 410 to curtail. Alternatively, the data center can operate and the process 400 proceeds to operation 415 if it is determined in operation 405 that an external indicator to curtail was not received (shown as "No" in FIG. 4).

Next, at operation 415, a check is performed to determine if a cost of power plus a down buffer is greater than the revenue from compute. According to various embodiments, the down buffer and the up buffer are set via a stochastic model on "cost to curtail" and predictions of power and market volatility. The down buffer and the up buffer are values generated by a data science model that streams real-time projections of the time needed to recover costs to curtail based on the volatility of power and magnitude of revenue loss or gain. If the cost of power added to (+) a down buffer is greater than the revenue from compute (shown as "Yes" in FIG. 4), then the operation 400 goes to operation 410 and curtails. The process 400 continues to operation 420 in the case that operation 415 determines that the cost of power plus a down buffer is not greater than (e.g., less than, equal) the revenue from compute.

Thereafter, operation 420 involves determining whether the cost of power minus (−) the up buffer is less than the revenue from compute. In the case where the cost of power minus the up buffer is less than the revenue from compute (shown as "Yes" in FIG. 4), then the process 400 goes to operation 425 and operates the power and/or compute load of the data center. Otherwise, if operation 425 determines that the cost of power minus the up buffer is not less than (e.g., greater than, equal) the revenue from compute (shown in FIG. 4 as "No") then continue the previous operation at the data center at operation 430.

Figure 5A:
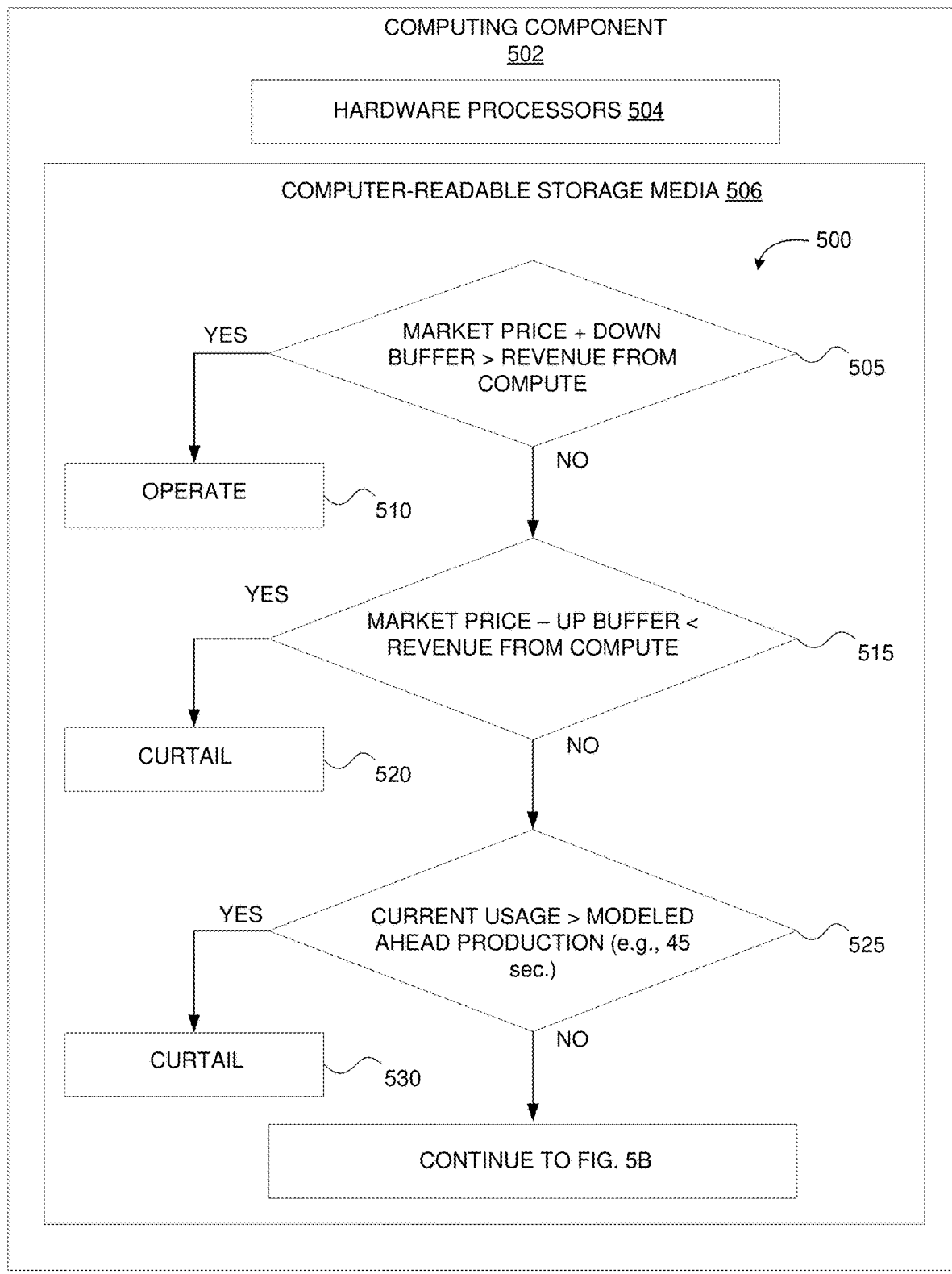
FIG. 5A-FIG. 5B depicts another example flow diagram of a method implementing a decision-making logic for operational value optimization, where the operation is implemented by the ROVO system of FIG. 1, in accordance with some embodiments of the application.
Figure 5B:
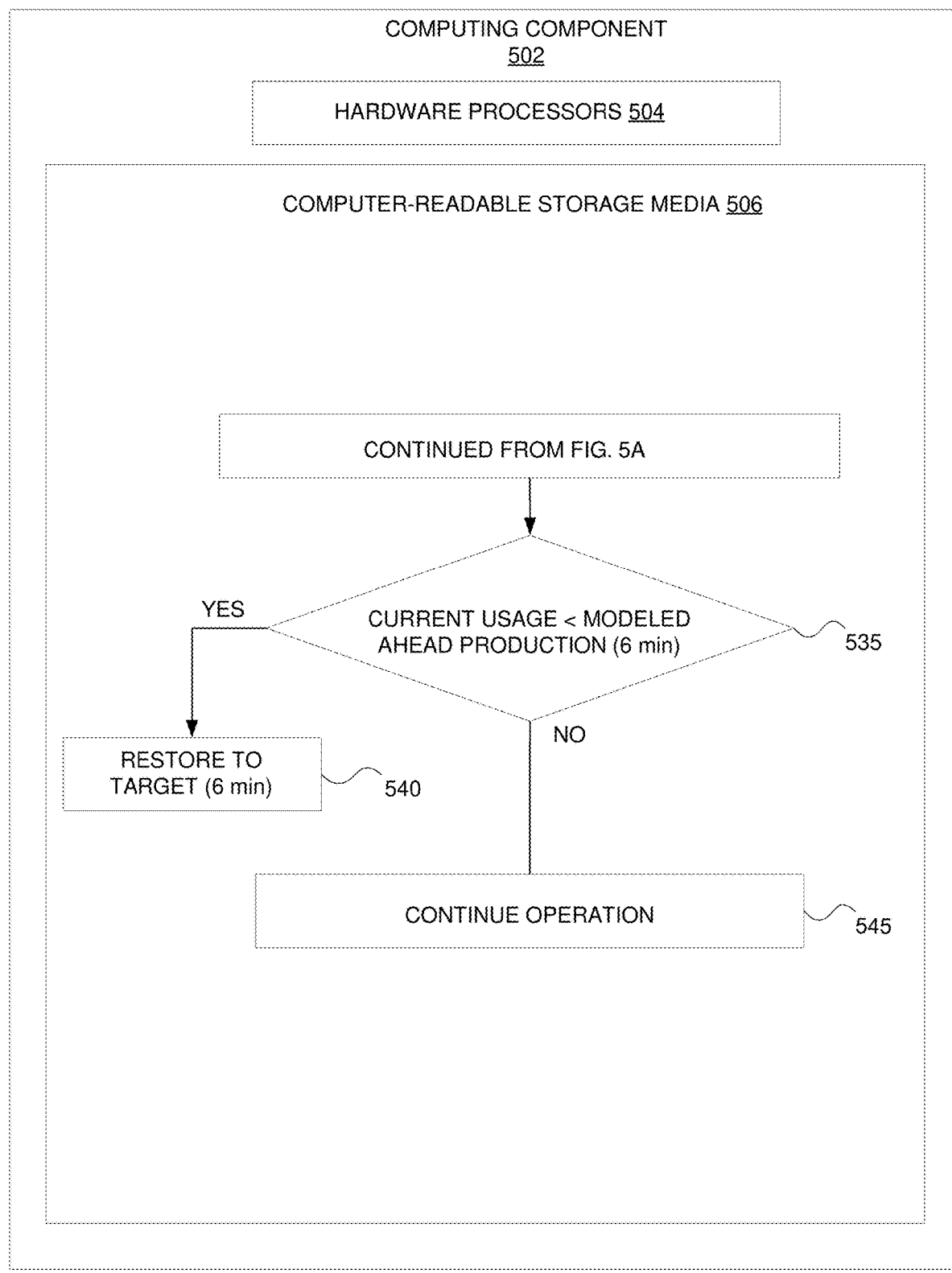

FIG. 5A-FIG. 5B diagram an example of a process 500 that is performed according to one embodiment of the systems and methods described herein. As seen in FIG. 5A-FIG. 5B, process 500 is illustrated as a series of executable operations in a machine-readable storage media 506 performed by a hardware processor 504. The computing component 502 can be a computer device used for implementing the disclosed operational value optimization functions described herein. For example, the computing component 502 may be the computer device implementing the ROVO system described above in reference to FIG. 1.

Process 500 can be described as implementing a decision-making logic that may be optimal for a B™ site, according to some embodiments. A B™ site scenario may have goals (e.g., differing from the goals of the previously described FOM site scenario of FIG. 4) which determine the logic of process 500, including: the site has no grid connection, and thus should react to all of the power generation volatility in real time while maximizing available compute, and more power should not be consumed than the power source (e.g., wind) produces. Process 500 may be configured to maximize operational efficiency (e.g., sites not connected to the grid). That is, the process 500 generally understands which machines were given command and discounts them from the metered usage until the impacts corresponding to the command are fully to power. Then, the system waits for a command to be sent to the server to get the state requested before issuing a subsequent curtailment or restore command.

In FIG. 5A, the process 500 starts at operation 505 which performs a conditional check to determine whether the market price plus (+) the down buffer is greater than the revenue from compute. In the case when the market price plus (+) the down buffer is greater than the revenue from compute (shown in FIG. 5A as "Yes") then the process 500 goes to operation 510 and operates. However, if operation 505 determines that the market price plus (+) the down buffer is not greater than (e.g., less than, equal) the revenue from compute (shown in FIG. 5A as "No"), then continue to operation 515.

At operation 515, the determination is made whether the market price minus (−) the up buffer is less than the revenue from compute. When operation 515 determines that the market price minus (−) the up buffer is less than the revenue from compute, then the process 500 curtails the data center at operation 520. Alternatively, the process 500 continues with the current operation of the data center and moves to the next operation 525 when it is determined in operation 515 that the market price minus (−) the up buffer is not less than (e.g., greater than, equal) the revenue from compute (shown in FIG. 5A as "No").

Subsequently, operation 525 involves another check to determine whether a current usage is greater than a forecasted power production. In the example, operation 525 uses a modeled 45 sec. ahead production. The process 500 then proceeds to perform curtailment to the 45 sec. target at operation 530, when the current usage is greater than the modeled 45 sec. ahead production (shown as "Yes" in FIG. 5A).

Referring back to operation 525, if is determined that the current usage is not greater than (e.g., less than, equal) a modeled 45 sec. ahead production (shown as "No" in FIG. 5A) then the process 500 goes to operation 353 in FIG. 5B.

Next, operation 535 determines whether the current usage is less than a modeled 6 minute ahead production. In the case where the current usage is less than a modeled 6 minute ahead production (shown as "Yes" in FIG. 5B), the process 500 subsequently goes to operation 540 to restore the data center to the 6 minute target. In the alternate case where operation 535 determines that the current usage is not less than (e.g., greater than, equal) a modeled 6 minute ahead production (shown as "No" in FIG. 5B), then the process 500 moves to operation 545 for the data center to continue its current operation.

Figure 6A:
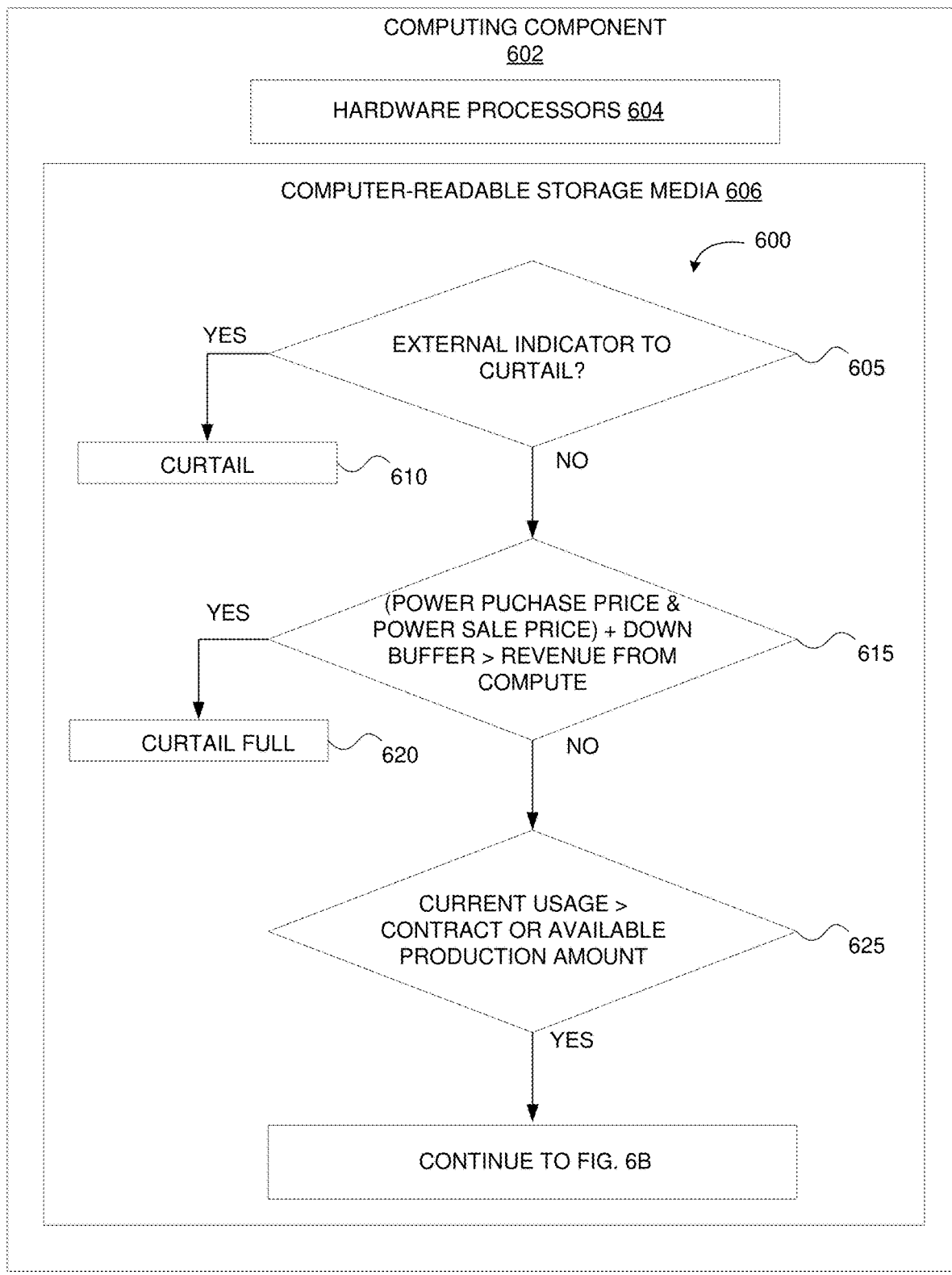
FIG. 6A-FIG. 6C depicts another example flow diagram of a method implementing a decision-making logic for operational value optimization, where the operation is implemented by the ROVO system of FIG. 1, in accordance with some embodiments of the application.
Figure 6B:
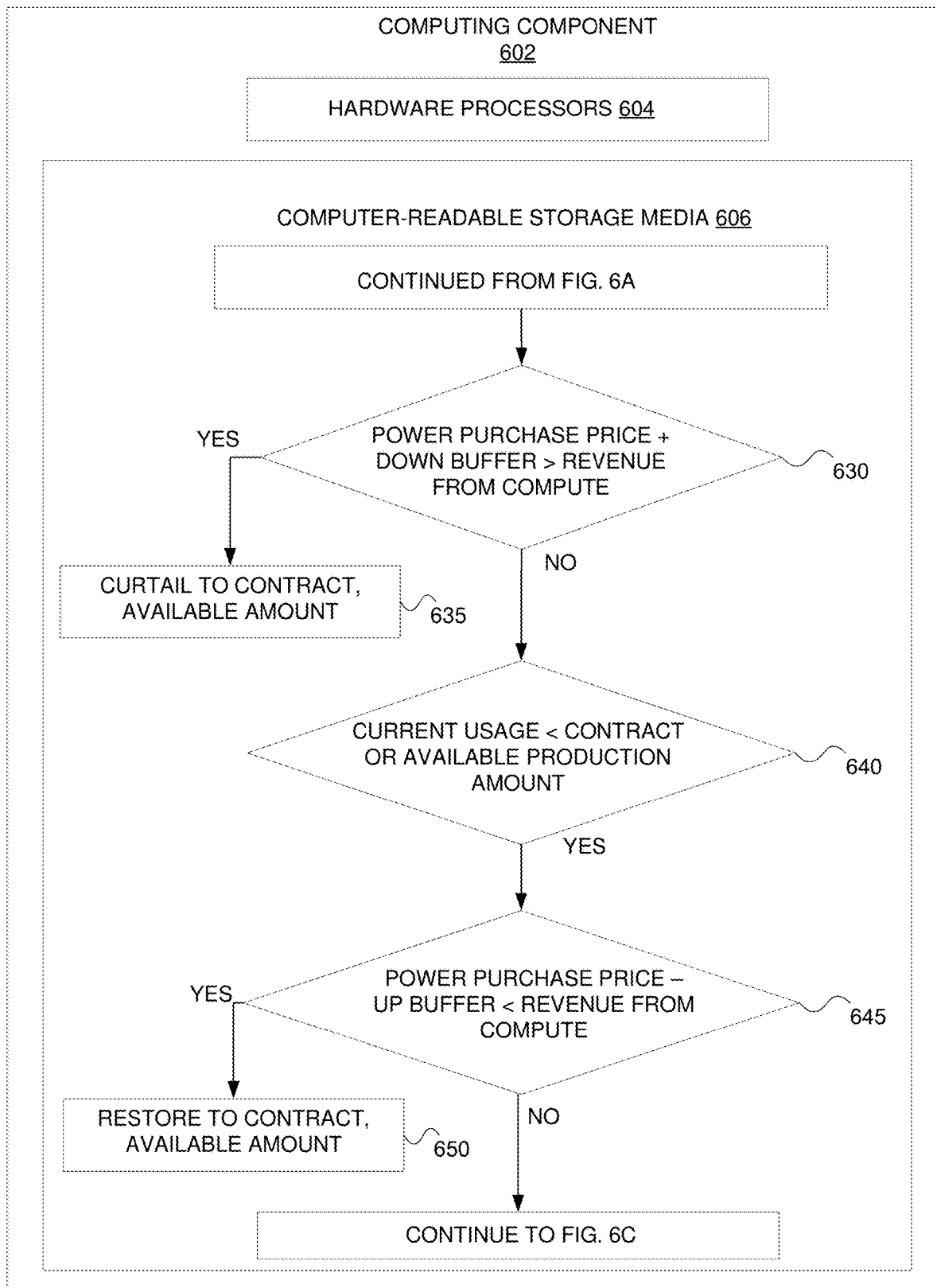
Figure 6C:
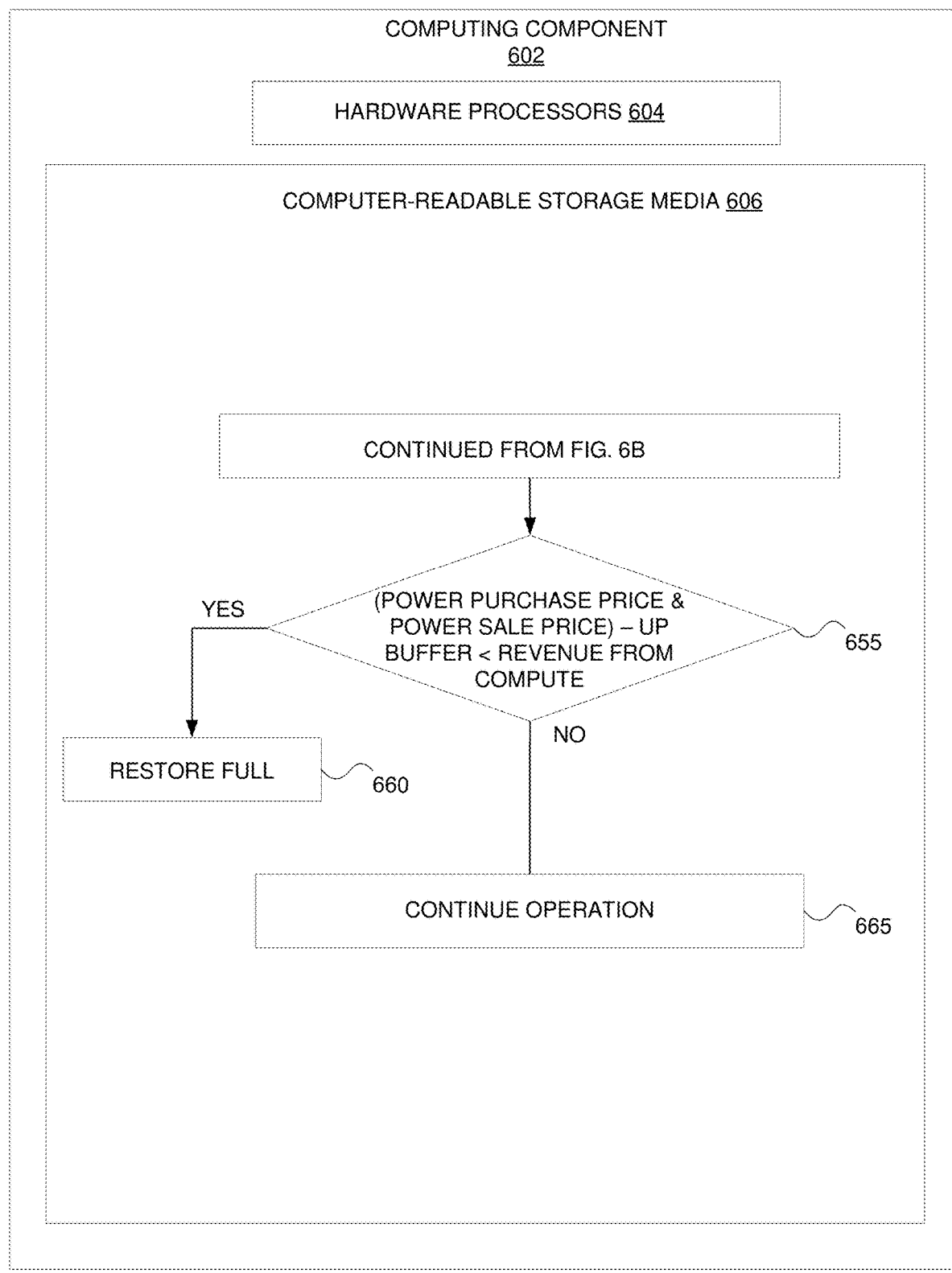

FIG. 6A-FIG. 6C diagram an example of a process 600 that is performed according to one embodiment of the systems and methods described herein. FIG. 6A-FIG. 6C show the process 600 as a series of executable operations in a machine-readable storage media 606 performed by a hardware processor 604. The computing component 602 can be a computer device or cloud compute resource used for implementing the disclosed operational value optimization functions described herein. For example, the computing component 602 may be the computer device implementing the ROVO system described above in reference to FIG. 1.

Process 600 can be described as implementing a decision-making logic that may be optimal for a hybrid site, according to some embodiments. As previously alluded to, a hybrid site can have aspects and challenges that are a combination of FOM sites and BOM sites. Thus, a hybrid site scenario may have its own unique optimization goals (e.g., differing from the goals of the previously described FOM site scenario of FIG. 4 and the BOM site scenario of FIG. 5A-FIG. 5B) which determine the logic of process 600, including: reacting to curtailment actions; enhancing revenue though power sales; optionality on take-or-pay obligations. In a broad sense, the process 600 may be configured to achieve optimization for profitability at scale.

FIG. 6A shows process 600 beginning at operation 605 to determine whether an external notice to curtail, for instance a notification from the power provider, has been received. If an external notice to curtail has been received, as determined by operation 605, then the process 600 moves on to operation 610 to curtail. In the alternative case, where operation 605 determines that no external notice to curtail has been received, then the data center can operate and the process proceeds to the next operation 615.

At operation 615, a determination is made as to whether both the price to sell power to capture revenue and also the price to purchase additional power from the grid in excess of the contracted amount, plus (+) the down buffer is greater than the revenue from compute, when the data center is currently operating. If operation 615 determines that the power purchase and sales prices plus (+) the down buffer is greater than the revenue from compute (shown in FIG. 6A as "Yes"), then the process 600 decides to fully curtail the data center at operation 620. Otherwise, if operation 615 determines that both the purchase and sales prices plus (+) the down buffer is not greater than (e.g., less than, equal) the revenue from compute (shown in FIG. 6A as "No"), then the process 600 continues to operation 625.

Subsequently, at operation 625, a next conditional check is performed to determine whether the current usage is greater than a contract or available production amount. When the current usage is greater than a contract or available production amount (shown in FIG. 6A as "Yes") then the process 600 goes on to operation 630 in FIG. 6B.

Thereafter, at operation 630, the process 600 determines whether the power purchase price plus (+) the down buffer is greater than revenue from the compute. If the purchase price plus (+) the down buffer is greater than revenue from the compute (shown in FIG. 6B as "Yes"), then the process 600 curtails to the contracted or available amount at operation 635. However, the process 600 steps to operation 640 when the purchase price plus (+) the down buffer is not greater than (e.g., less than, equal) the revenue from the compute (shown in FIG. 6B as "No").

Then, operation 640 checks whether the current usage is less than a contracted or available production amount. If the current usage is less than a contracted or available production amount (shown as "Yes" in FIG. 6B), then process 600 goes to the next operation 645.

At operation 645, another conditional check is performed to determine whether the (e.g., power purchase price minus (−) the up buffer is less than the revenue from compute. When operation 645 determines that the purchase price minus (−) the up buffer is less than the revenue from compute (shown in FIG. 6B as "Yes"), then the process 600 decides to restore the data center to the contracted or available amount at operation 650. Alternatively, when the power purchase price minus (−) the up buffer is not less than (e.g., greater than, equal) the revenue from compute (shown in FIG. 6B as "No"), then the process 600 goes to the next operation 655 in FIG. 6C.

In operation 655, it is determined if the power purchase and sales prices minus (−) the up buffer is less than the revenue from compute. In the case where both the purchase and sales prices minus (−) the up buffer is less than the revenue from compute (shown as "Yes" in FIG. 6C), then the data center is fully restored in operation 660. Otherwise, if both the purchase and sales prices minus (−) the up buffer is not less than (e.g., greater than, equal) the revenue from compute (shown as "Yes" in FIG. 6C), then process 600 continues to operation 665 and the data center continues the current operation. Accordingly, the methods disclosed herein, for example described in reference to FIG. 4-FIG. 6C, can realize a modular and flexible logic which may be adapted to the specific scenario at the site, thereby enhancing the operational value optimization that is achieved at the site.

Figure 7:
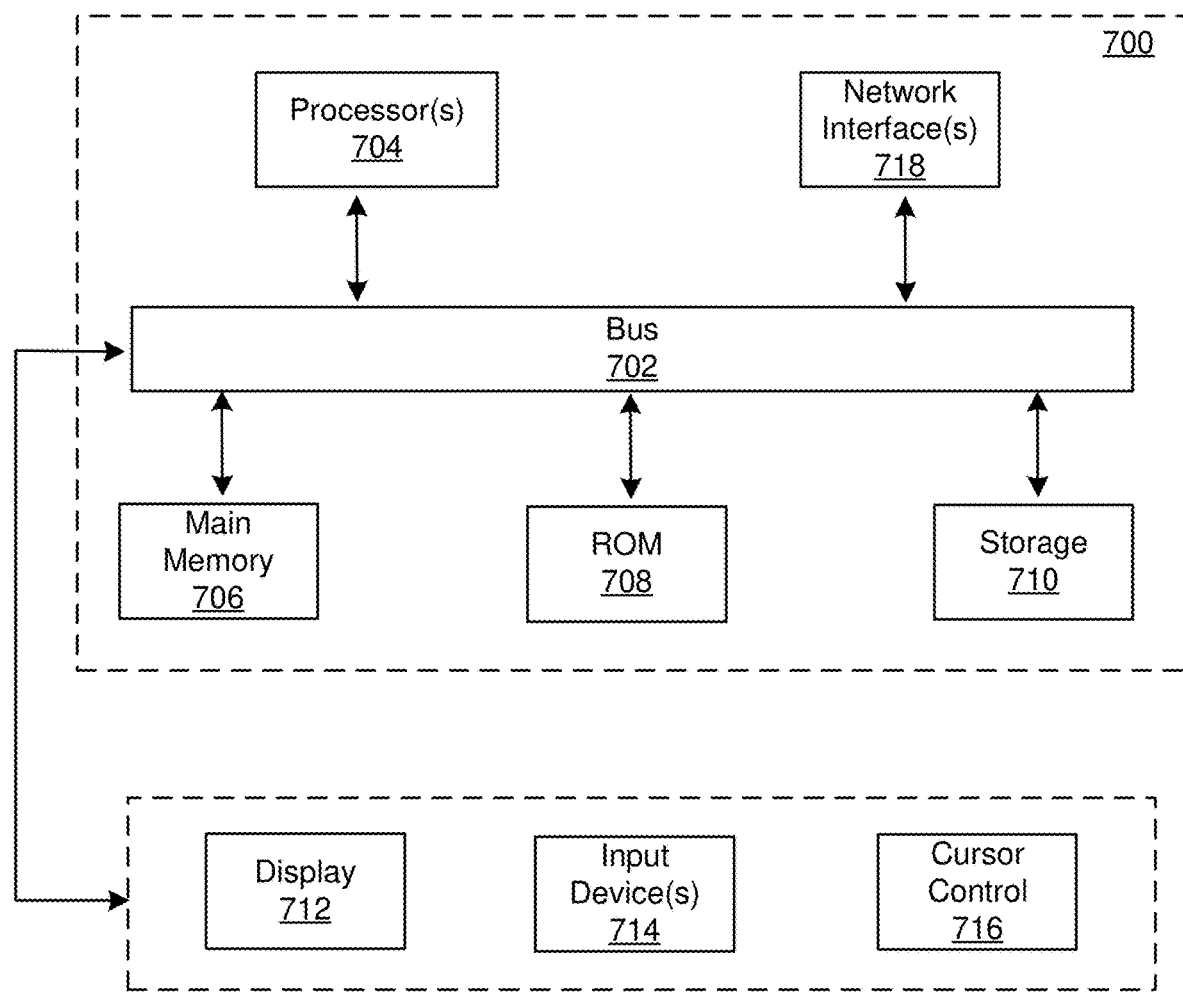
FIG. 7 is a block diagram of an example computing component or device for implementing the disclosed techniques, in accordance with the disclosure.

FIG. 7 depicts a block diagram of an example computer system 700 in which various features of operational value optimization described herein may be implemented. As an example, the computer system 700 can be the ROVO system described in FIG. 1. The computer system 700 includes a bus 702 or other communication mechanism for communicating information, one or more hardware processors 604 coupled with bus 702 for processing information. Hardware processor(s) 704 may be, for example, one or more general purpose microprocessors or other compute resource.

The computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other immutable storage device coupled to bus 702 for storing static information and instructions for processor 704. A storage device 710, such as a magnetic disk, optical disk, or USB thumb drive (Flash drive), message topic, etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interruptions. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASIC FPGA chips, firmware and/or program logic which in combination with the computer system causes or programs computer system 600 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or wide area network (WAN) component to communicate with a WAN). Wireless links may also be implemented. In any such implementation, communication interface 718 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 718, which carry the digital data to and from computer system 700, are example forms of transmission media. The computer system 700 can send messages and receive data, including program code, through the network(s), network link and communication interface 718. In the Internet example, a server might transmit a requested code for an application program through the Internet, the ISP, the local network, and the communication interface 718. The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (Saas). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method, comprising:
receiving a plurality of inputs in real time associated with events impacting at least one of a plurality of operating parameters of a resource site;
applying a defined logic to the plurality of real-time inputs, wherein the defined logic analyzes changes in at least one of the plurality of operating parameters of the resource site in real time based on the plurality of real-time inputs and based on a feedback loop;
dynamically determining a dynamic value optimization for the resource site based on the defined logic, wherein determining the dynamic value optimization comprises an analysis of a price of power to operate the resource site, revenue from operating the resource site at a determined capacity, and at least one of an up buffer or a down buffer, wherein the up buffer and down buffer are calculated based on real-time projections of costs to curtail operations of the resource site below the determined capacity; and
performing real-time control of at least one of power, compute load, or resource site infrastructure in accordance with a profitability analysis to achieve and maintain a determined target operational state, wherein the real-time controls comprise continuously adjusting controls of the resource site to alter power usage and achieve and maintain the determined target operational state in real time to reach the determined dynamic value optimization.

2. The computer-implemented method of claim 1, wherein dynamically determining a dynamic value optimization for the resource site comprises continuously monitoring at least one of the plurality of real-time inputs in real time to determine at least one of a compute target and a power utilization target.

3. The computer-implemented method of claim 2, wherein performing real-time control of at least one of power, compute load, or resource site infrastructure comprises sending controls in real time to coordinate resources at the resource site in a manner to reach the determined target operational state.

4. The computer-implemented method of claim 1, further comprising performing modeling of the real-time inputs to dynamically extrapolate a predicted operational state for the resource site.

5. The computer-implemented method of claim 1, wherein the defined logic applies a model to provide predictions for future available capacity of an intermittent power source supplying power to the resource site, based on modeling and analyzing real-time data relating to operation of the intermittent power source.

6. The computer-implemented method of claim 1, wherein the real-time inputs comprise at least one of ambient conditions, power production, power price data, cost of curtailment, or compute revenue.

7. The computer-implemented method of claim 1, wherein performing real-time control of one or more of power, compute load, or resource site infrastructure at the resource site comprises dynamically generating controls to effectuate adjustment of the resource site in real time.

8. The computer-implemented method of claim 7, wherein the dynamically generated controls control elements of the resource site in real time, the elements comprising at least one of power, compute load, or resource site infrastructure to optimize data center efficiency.

9. The computer-implemented method of claim 7, wherein the dynamically generated controls control at least one of full or partial curtailment of compute load, full or partial restoration of compute load, or control of infrastructure components of the resource site.

10. The computer-implemented method of claim 7, further comprising generating new adjustments to controls to achieve continuous fine-tuning of operation of the resource site.

11. The computer-implemented method of claim 7, wherein performing real-time control of at least one of power, compute load, or resource site infrastructure at the resource site to achieve and maintain a determined target operational state, comprises continuously maintaining a desired run state of the resource site.

12. The computer-implemented method of claim 1, wherein application of the defined logic includes real-time training, implementation and calibration of discrete, stochastic, statistical, machine learning (ML), or artificial intelligence (AI) models associated with power consumption by the resource site using the plurality of inputs.

13. The computer-implemented method of claim 12, wherein power supplied to the resource site comprises one or more intermittent power sources, and at least one of the models predicts availability of power generated by the one or more intermittent power sources to determine the dynamic value optimization for the resource site.

14. The computer-implemented method of claim 12, wherein the resource site is associated with a front-of-meter (FOM) site, a behind-the-meter (B™) site, or a hybrid site, and at least one of the defined logic is re-configurable corresponding to each of the respective FOM site, the B™ site, and the hybrid site.

15. The computer-implemented method of claim 1, wherein the real-time controls comprise at least one of: fully curtailing power or compute load at the resource site, partially curtailing power or compute load at the resource site, fully restoring power or compute load at the resource site, or partially restoring power or compute load at the resource site.

16. The computer-implemented method of claim 1, wherein the real-time projections of the costs to curtail operations of the resource site below the determined capacity comprise real-time projections based on an amount of time needed to recover the costs to curtail operations.

17. The computer-implemented method of claim 1, wherein the at least one of the up buffer or the down buffer are calculated based on a prediction of market volatility of power pricing.

18. A computer system, comprising:
one or more processors; and
a memory having instructions stored thereon, which when executed by the one or more processors cause the processors to perform operations of:
receiving a plurality of inputs in real time associated with events impacting at least one of a plurality of operating parameters of a resource site;
applying a defined logic to the plurality of real-time inputs, wherein the defined logic analyzes changes in at least one of the plurality of operating parameters of the resource site in real time based on the plurality of real-time inputs and based on a feedback loop;

dynamically determining a dynamic value optimization for the resource site based on the defined logic, wherein determining the dynamic value optimization comprises an analysis of a price of power to operate the resource site, revenue from operating the resource site at a determined capacity, and at least one of an up buffer or a down buffer, wherein the up buffer and down buffer are calculated based on real-time projections of costs to curtail operations of the resource site below the determined capacity; and performing real-time control of at least one of power, compute load, or resource site infrastructure in accordance with a profitability analysis to achieve and maintain a determined target operational state, wherein the real-time controls comprise continuously adjusting controls of the resource site to alter power usage and achieve and maintain the determined target operational state in real time to reach the determined dynamic value optimization.

19. The computer system of claim 18, wherein dynamically determining a dynamic value optimization for the resource site comprises continuously monitoring at least one of the plurality of real-time inputs in real time to determine at least one of a compute target and a power utilization target.

20. The computer system of claim 19, wherein performing real-time control of at least one of power, compute load, or resource site infrastructure comprises sending controls in real time to coordinate resources at the resource site in a manner to reach the determined target operational state.

21. The computer system of claim 18, further comprising performing modeling of the real-time inputs to dynamically extrapolate a predicted operational state for the resource site.

22. The computer system of claim 18, wherein the defined logic applies a model to provide predictions for future available capacity of an intermittent power source supplying power to the resource site, based on modeling and analyzing real-time data relating to operation of the intermittent power source.

23. The computer system of claim 22, wherein real-time data relating to operation of a wind power source supplying power to the resource site comprises at least one of weather data or production data from the wind power source.

24. The compute system of claim 18, wherein the real-time inputs comprise at least one of ambient conditions, power production, power price data, cost of curtailment, or compute revenue.

25. The computer system of claim 18, wherein performing real-time control of one or more of power, compute load, or resource site infrastructure at the resource site comprises dynamically generating controls to effectuate adjustment of the resource site in real time.

26. The computer system of claim 25, wherein the dynamically generated controls control elements of the resource site in real time, the elements comprising at least one of power, compute load, or resource site infrastructure to optimize data center efficiency.

27. The computer system of claim 25, wherein the dynamically generated controls control at least one of full or partial curtailment of compute load, full or partial restoration of compute load, or control of infrastructure components of the resource site.

28. The computer system of claim 18, wherein the real-time controls comprise at least one of: fully curtailing power or compute load at the resource site, partially curtailing power or compute load at the resource site, fully restoring power or compute load at the resource site, or partially restoring power or compute load at the resource site.

29. The computer system of claim 18, wherein the real-time projections of the costs to curtail operations of the resource site below the determined capacity comprise real-time projections based on an amount of time needed to recover the costs to curtail operations.

30. The computer system of claim 18, wherein the at least one of the up buffer or the down buffer are calculated based on a prediction of market volatility of power pricing.

* * * * *